United States Patent [19]

Schaub et al.

[11] 3,787,166

[45] Jan. 22, 1974

[54] PROCESS FOR THE THERMAL TREATMENT OF RUBBER AND OTHER PLASTIC MATERIALS

[75] Inventors: Franz Schaub, Oberhausen; Sebastian Speth, Duisburg, both of Germany

[73] Assignee: Ruhchemie Aktiengesellschaft, Oberhausen-Holten, Germany

[22] Filed: Jan. 29, 1973

[21] Appl. No.: 327,701

[30] Foreign Application Priority Data

Feb. 3, 1972    Germany.............................. 2205001

[52] U.S. Cl.................. 431/11, 110/7 R, 48/197 A, 260/96 D
[51] Int. Cl............................................. F23d 11/44
[58] Field of Search............... 431/11; 110/7 R, 8 R; 48/197 A; 260/96 D

[56] References Cited

UNITED STATES PATENTS

| | | | |
|---|---|---|---|
| 3,362,887 | 1/1968 | Rodgers | 48/197 A |
| 3,338,991 | 3/1966 | Goldmann et al. | 431/11 |
| 1,929,424 | 10/1933 | Heaton | 110/24 X |

*Primary Examiner*—William F. O'Dea
*Assistant Examiner*—W. C. Anderson
*Attorney, Agent, or Firm*—Bierman & Bierman; Jordan B. Bierman; Linda G. Bierman

[57] ABSTRACT

Wastes of the group comprising synthetic plastics and rubber are thermally disposed of by cracking at temperatures between 250° and 450°C. The cracking may be carried out in the presence of an auxiliary medium which is in the liquid state at the reaction temperature and capable of dissolving the wastes and/or the cracking products at least partially. The thermal decomposition may be accelerated by the addition of catalysts.

9 Claims, No Drawings

PROCESS FOR THE THERMAL TREATMENT OF RUBBER AND OTHER PLASTIC MATERIALS

The production of thermoplastic and thermosetting materials by polymerization or polycondensation respectively, of suitable low molecular compounds and their use in industry, trade and commerce increases steadily. Serious problems arise from the destruction of plastic and rubber wastes which must be solved in a manner which does not influence the environment detrimentally. Thus, it is seldom possible to burn plastic materials in the open air without the formation of soot or noxious waste gases. Burning in furnaces without grate firing, as for instance in muffle or revolving tubular furnaces, has so far been considered among experts as the safest process for the disposal of such industrial wastes. However, the conditions for continuously performing such disposal are impractical because these wastes are often not available in adequate amounts to maintain a permanent combustion process.

Difficulties arise further from the fact that it is not always possible to adapt the combustion process in a simple manner to the prevailing special conditions. For example, plastic materials of different chemical and physical characteristics must be disposed of frequently simultaneously. The wastes may also contain different foreign materials of organic or inorganic nature. Therefore, the known combustion processes generally provide for a prior separation of those impurities or require special measures for the purification of the resulting combustion gases.

The difficulties arising from the disposal of plastic wastes are shown in the following discussion. Owing to their high heating value (Hu = about 10,000 kgcal/kg) hydrocarbon polymers, for example, are well suited as fuel in steam power plants. However, the wastes are obtained in various forms, e.g., as powder, foil, semifinished material of molded bodies. Furthermore, unusable residues from the production process are frequently admixed with wax or naphtha. They may also contain incombustible and unfusible foreign substances which seriously aggravate or even prevent satisfactory transport, feeding and atomization, which are necessary for proper combustion. Proper distribution in air is required to prevent the formation of soot and to ensure smokeless combustion. Furthermore, incombustible foreign substances contained in the wastes may cause damage or obstruction of the combustion device.

It is therefore an object of the invention to provide a process which does not suffer from the foregoing difficulties and allows a simple, economic and effective disposal of plastic and rubber wastes without deleterious effects on the environment.

The present invention comprises cracking plastics and rubber wastes at temperatures between 250° and 450°C and introducing the products, after separation of detrimental components, if desired, directly or indirectly into a combustion device.

The process renders the disposal of unusable synthetic and rubber materials possible. It is applicable to the most varied thermoplastic and thermosetting synthetic materials as for instance polyolefins, vinyl resins, e.g., polyvinylchloride, polyvinylacetate, polyvinylalcohol, polystyrene, as well as polycarbonates, polymethylene oxides, polyacrylates, polyurethanes, polyamides, polyester resins, as well as hardened epoxy resins and all types of natural and synthetic rubber. It is advantageous to divide the starting materials mechanically preceding the thermal cracking in order to assist the thermal decomposition.

The decomposition of the wastes can be accelerated by the addition of suitable catalysts. For instance, polyolefins can be easily cracked to form low molecular products in the presence of manganese, vanadium, copper, chromium, molybdenum or tungsten compounds at elevated temperature.

The thermal decomposition can be preferred in the presence of air or oxygen. Generally, however, care should be taken to suppress or to limit the intake of oxygen in order to prevent the formation of oxygen-containing decomposition products such as low molecular carboxylic acids which may damage the combustion equipment. It is also possible to suppress the oxidation by addition of suitable inhibitors such as higher molecular amines or substituted phenol derivatives.

According to a preferred embodiment of the invention, the cracking is carried out in the presence of an auxiliary medium which is in the liquid state at the reaction temperature. This auxiliary phase serves to transmit the heat to the starting materials in the reactor. Furthermore, it facilitates the thermal decomposition by swelling the solid substances to gel-like condition.

The auxiliary liquid phase need not necessarily be entirely thermally stable at the working temperature. Its partial decomposition can be tolerated, since it is replenished by liquid, high-boiling substances formed during the cracking of the polymeric starting materials. It is also possible to replenish the auxiliary medium if necessary together with the wastes to be disposed of.

It is preferable to use as the auxiliary phase substances which at least partially dissolve the starting waste materials and the products of cracking at the prevailing reaction temperature. Well suited as the auxiliary phase are naturally occurring or synthetic wax-like hydrocarbons such as paraffin wax, lignite wax, polyethylene wax having a molecular weight between 1,000 and 10,000 as well as polyglycols and similar compounds. The process of the invention can be performed in conventional reactors, as for instance in closed agitator vessels equipped with heating devices.

Cracking without the auxiliary medium may be achieved by charging the reactor with the starting material and heating it slowly to the desired cracking temperature. It is preferred, however, to introduce into the reactor an auxiliary phase, to heat to the required cracking temperature and to introduce the waste materials into the auxiliary phase.

It is essential for assuring a substantially constant cracking temperature to introduce the starting materials in small increments into the reactor, preferably continuously. If the starting materials are introduced at intervals, a marked temperature decrease occurs in the auxiliary phase so that the velocity of the cracking is subject to considerable fluctuation. Furthermore, by the continuous addition of the wastes, sudden retardation of ebullition of the auxiliary medium is prevented, if for instance wastes admixed with low boiling or light volatile substances (such as water) are introduced.

The resulting products of cracking may be discharged in a liquid form from the reactor. Advantageously, however, they are drawn off in the vapor state at approximately the temperature prevailing in the reactor and may be introduced, for example, directly into combustion equipment. They may also be separated into gas and liquid products in cooling devices, and separately passed to subsequent use. By this process, the materials are handled, introduced into the reactor and burned in a sootless and smokeless manner. Furthermore it is possible to use the liquid cracking products as solvents, e.g., for extraction and purification prior to combustion.

The novel process for the working up of plastic and rubber wastes makes it possible to eliminate the solid impurities and the inorganic additives (if present), as by discharging at the bottom of the cracking reactor. During continuous operation, small amounts of carbon black formed during the cracking process remain in the auxiliary phase along with the solid impurities introduced with the wastes. This may cause a decrease of cracking velocity which can be compensated for by increasing the temperature or by discharging the carbon black together with small amounts of the starting materials at the bottom of the reactor in the liquid state.

The process according to the invention also gives satisfactory results insofar as the liberating of undesirable gases during the cracking process is concerned. With prior art processes, it is necessary to pass the entire combustion gas through purification devices of various kinds. With the process of the present invention it becomes possible to perform the cracking in two or more stages, whereby the cracking operation in the different stages is generally carried out at temperatures increasing from stage to stage. If chlorine containing polymers are used, it proved advantageous to carry out a two-stage cracking with low temperatures between about 250° to 300°C in the first stage and higher temperatures between about 300° and 400°C in the second stage. With the stepwise cracking of the chlorine-containing polymeric substances, the cracking products liberating dangerous gases can be preferentially enriched in the first stage, so that only a part of the resulting cracking products must be passed through a purification device at the subsequent separation of obnoxious gases.

The following examples illustrate the invention:

EXAMPLE 1

A 4 liter three-necked flask, equipped with a ground-in stirrer, contact thermometer and fractionation column, was charged with 1500 g. of polyethylene wax having a molecular weight of about 3000 and heated by an umbrella-type heating cap to a temperature of 375° to 380°C. 400 to 500 g. of pulverulent polyethylene wastes were uniformly introduced into the hot polyethylene wax within one hour. After 5 hours, 2100 g. polyethylene wastes had been introduced. 1995 g. liquid cracking products were obtained, corresponding to 95 percent by weight of the charge.

By gas chromatographical analysis, the following composition of the cracking product was determined:

Hydrocarbons having four to 10 carbon atoms — 22.5% by weight
Hydrocarbons having 11 to 20 carbon atoms — 62.5% by weight
Hydrocarbons having 21 to 25 carbon atoms — 15.0% by weight

EXAMPLE 2

As described in Example 1, 400 to 450 g. of coarse crushed basically-hardened epoxy resin (bisphenol A resin) per hour were introduced with stirring into wax heated to a temperature of 385°C. After 6 hours, the test was terminated. During this time, 2550 g. of epoxy resin waste had been introduced. The yield of liquid cracking products amounted to 2460 g. corresponding to 96.2% of the charged resin.

Gaschromatographical analysis revealed the following composition of the condensed cracking products:
Hydrocarbons having four to 10 carbon atoms — 47.7% by weight
Hydrocarbons having 11 to 15 carbon atoms — 29.0% by weight
Hydrocarbons having 16 to 20 carbon atoms — 19.2% by weight
Hydrocarbons having more than carbon atoms — 4.1% by weight

EXAMPLE 3

As described in Example 1, 300 g. of comminuted rubber wastes per hour were introduced into the wax phase at 380° to 385°C. The entire charged wastes amounted to 1895 g. after 6 hours. 1715 g. liquid cracking product distilled over into the collecting vessel, corresponding to 90.5% of the charged wastes.

Gas chromatographical analysis revealed the following composition of the products:
Hydrocarbons having four to 10 carbon atoms — 74.9% by weight
Hydrocarbons having 11 to 15 carbon atoms — 22.0% by weight
Hydrocarbons having 16 to 20 carbon atoms — 3.0% by weight The remaining 0.1 percent by weight were hydrocarbons having more than 20 carbon atoms.

EXAMPLE 4

The cracking reactor of a pilot plant having a useful reaction volume of 3.4 m³ was charged with 1.8 m³ polyethylene wax. The wax was heated to 375° to 385°C and 65 kg. of polyethylene powder per hour were intermittently introduced. 61 kg. of distillate were obtained per hour corresponding to 94 percent by weight based on the charged wastes.

The composition of the distillate was similar to that of Example 1.

EXAMPLE 5

In the 4 liter laboratory device described in Example 1, approximately 300 g. per hour of comminuted polyvinylchloride wastes containing about 45 percent by weight chlorine were uniformly introduced with stirring into the wax which had been heated to 250°C. After 4 hours, the addition of wastes was terminated. 1230 g. wastes had been added during this time. The gaseous cracking product exiting from the distillate receiver was separated from the split off hydrogen chloride by passing it, during the cracking reaction, through a battery of washing devices. These devices comprised several washing stages filled with water and an additional washing unit containing 5 percent sodium hydroxide solution. Heating of the wastes introduced into the wax to 250°C was continued until the evolution of gas appreciably decreased. This was the case after 5 hours from the beginning of the introduction of the waste materials. During this time, 128 g. of liquid cracking product, corresponding to 10.2 percent by weight of the charged wastes, had accumulated in the receiver. The clear distillate had a chlorine content of 1.7 percent by weight.

The interior temperature of the reaction mixture was increased to 350°C without further addition of waste material. After heating for 3 hours, 535 g. of liquid cracking products having a chlorine content of 0.15 percent by weight were distilled over and collected in the receiver. This amount corresponds to 43.5 percent by weight of the charge. Only a small formation of gaseous cracking products had been observed.

Gas chromatographical analysis of the liquid cracking product revealed the following result:

|  | First distillate | Second distillate |
|---|---|---|
| Hydrocarbons having 4 to 10 carbon atoms | 34.9% by weight | 27.4% by weight |
| Hydrocarbons having 11 to 20 carbon atoms | 63.4% by weight | 64.2% by weight |
| Hydrocarbons having more than 20 carbon atoms | 1.7% by weight | 8.4% by weight |

What is claimed is:

1. A process for the thermal treatment of materials comprising synthetic plastics and rubber which comprises cracking the materials at temperatures between 250° and 450°C to form cracking products and introducing the products into a combustion device.

2. The process according to claim 1 wherein at least some components of said products are separated therefrom before entry into the combustion device.

3. The process according to claim 1 wherein the cracking is carried out at a temperature of from 350° to 450°C.

4. The process according to claim 1 wherein the cracking is carried out in the presence of an axiliary medium in the liquid state at the reaction temperature.

5. The process according to claim 4 wherein the auxiliary medium at least partially dissolves the materials or the products at the reaction temperature.

6. The process according to claim 4 wherein the auxiliary phase comprises naturally occurring or synthetic wax-like hydrocarbon compounds.

7. The process according to claim 1 wherein the cracking is performed in the presence of catalysts accelerating the decomposition of the materials.

8. The process according to claim 1 wherein the materials are continuously introduced into a cracking reactor and the products are drawn off in the vapor phase.

9. The process according to claim 1 wherein the cracking is carried out in several stages, the temperature increasing from stage to stage.

* * * * *